UNITED STATES PATENT OFFICE.

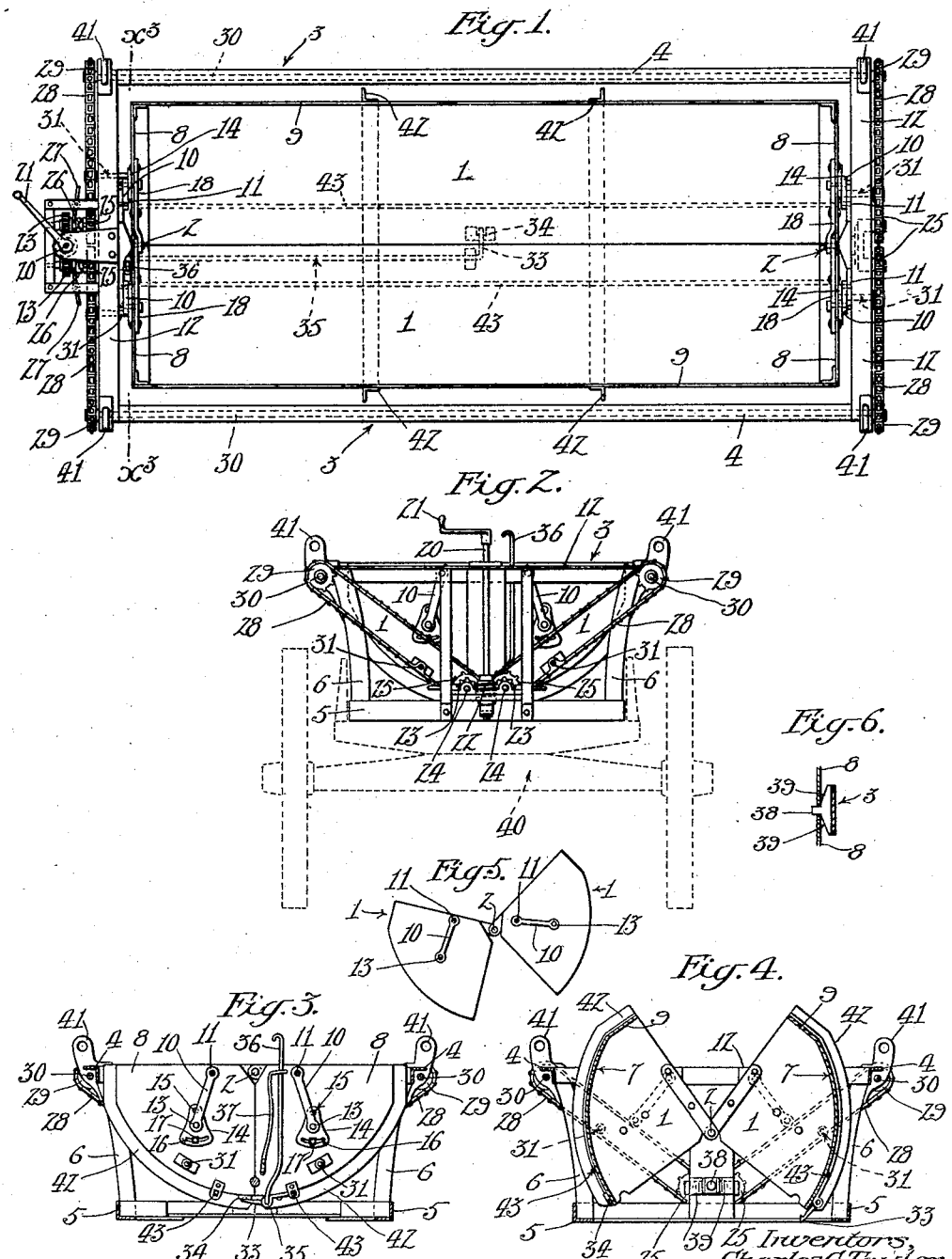

CHARLES C. TAYLOR, GEORGE W. WOOD, AND MAYHEW A. VINCENT, OF SAN DIEGO, CALIFORNIA.

DUMP-BED.

No. 874,875.  Specification of Letters Patent.  Patented Dec. 24, 1907.

Application filed September 4, 1906. Serial No. 333,258.

*To all whom it may concern:*

Be it known that we, CHARLES C. TAYLOR, GEORGE W. WOOD, and MAYHEW A. VINCENT, citizens of the United States, residing at San Diego, in the county of San Diego and State of California, have invented a new and useful Dump-Bed, of which the following is a specification.

This invention relates to improvements in the dump bed shown in our application Serial No. 323,409, filed June 25, 1906, wherein the dump bed comprises two members pivoted together to swing outwardly and upwardly, so as to open the dump bed along its center.

An important object of the invention is to provide simple and effective means for operation or control of the dump bed members.

A further object of the invention is to provide means for support of the dump bed members enabling them to move freely in the requisite manner.

Another object of the invention is to provide means for adjusting the fulcrum whereon the dump bed members are supported relatively to the center of gravity of the said members, or of the contents thereof, so as to regulate the amount of power required for the dumping operation.

Another object of the invention is to provide improved means for locking the dump bed members in closed position.

In the accompanying drawings: Figure 1 is a plan of a dump bed embodying the invention. Fig. 2 is a front elevation thereof with a truck or supporting vehicle shown in dotted lines. Fig. 3 is a vertical transverse section on the line $x^3$—$x^3$ in Fig. 1. Fig. 4 is a vertical transverse section through the dump bed members showing the same in open position. Fig. 5 is a diagrammatic end view of the bed showing the positions of the parts when the bed is dumped at one side only. Fig. 6 is a detail of a stop for the bed members.

The dump bed consists of two members or shells 1 pivotally connected together at 2, and supported on a frame 3. Said frame may be of any suitable shape but is shown as consisting of top and bottom rectangular frames 4, 5 and posts 6 connecting the same.

Each dump bed member 1 consists of a shell of metal, or other suitable material with its longitudinal portions bent mainly in the form of an arc of a cylinder to form a curved outer wall portion 7, with the ends 8 bent in at right angles to such portion 7 to form the ends of the dump bed, the end portions 8 of the two members being flat sectors and provided with overlapping bars 18 at their inner corners which are pivoted together by pins, bolts or rivets 2. The upper portion 9 of the outer wall of each of the dump bed members may be made straight so as to lie in a vertical plane when the bed is closed. Each dump bed member is supported on the frame by means of an arm or link 10 pivoted at 11 at its upper end to the end bar 12 of the top frame 4, the lower end of said link being pivoted at 13, to a fulcrum member 14, pivoted at 15 to the end portion 8 of a bed member 1, and provided with means, such as a slot 16, engaged by a clamp bolt 17 on the bed frame, to adjust said member 14 relatively to the bed members, to shift the fulcruming point relatively to the bed frame, for the purpose hereinafter set forth.

The operating means for the dump bed comprises a shaft 20 mounted to turn in bearings on frame 3, and provided with an operating handle 21, said shaft carrying a worm 22, engaging two worm wheels 23, on shafts 24, also mounted on frame 3. Sprocket wheels 25 loosely mounted on each shaft 24 can be clutched thereto by a clutch 26, operated by a lever 27, and a chain 28 runs over said sprocket wheel and over another sprocket wheel 29 on a shaft 30 journaled on the frame 3. Each chain 28 is connected to one of the bed members 1, as by means of a projection 31 on the bed member engaging in a link of the chain. The shafts 30, extend the full length of the frame 3 on each side thereof and are connected to the dump bed member 1 at each end by the sprocket wheels 25, 29 and chains 28. The dump bed is thereby operated at both ends simultaneously and the worm gear acting as a lock against back movement the dump bed is, when closed, held firmly at both ends. To prevent the middle portion sagging open, a retainer therefor is provided consisting of a catch 33 on one member 1 engaging with a hasp 34 on the other member 1 and carried by a rod 35 extending longitudinally to the end of the dump bed, where it is provided with an arm 36, extending up into the path of operating handle 21, the upper end of arm 36 being rounded or beveled to permit it to yield more freely in the passage of handle 21. A spring 37 acts on the arm 36 to move the retaining catch to engaged position. A stop 38 is provided on frame 3, engaging the end plates 8 to arrest the bed members in closing, said stop having inclines 39 which force the end plates to proper position. Bed members 1 have ribs 42 and longitudinal braces 43. The dump bed frame 3 is flat bottomed, to adapt it to rest on a support, such as a flat car, or a wagon frame, indicated in dotted lines at 40, Fig. 2.

The operation is as follows:—Fulcrum members 14 are adjusted to bring the point of support of the dump bed member as nearly as may be desired under the center of gravity of the dump bed. By moving the fulcrum point outwardly, the weight of the bed and its contents will be given a stronger effect in tending to dump the bed, and by moving it inwardly, the force required to reset the bed will be lessened. In general, the adjustment will be such that the bed members with their contents are almost balanced over the fulcrums, but with a slight opening tendency. When the bed is being filled it is held closed by the connections at each end to the operating worm device, and by the retainer at the middle. When the bed is to be dumped, this may be affected by manual operation of the handle 21, acting through the chain of mechanism 22, 23, 24, 25, etc., to swing the bed members outwardly and upwardly to open position, shown in Fig. 4, or it may be effected by releasing clutches 26, allowing the bed members to move to open position under the weight of the contents thereof. In its initial movement the handle 21 strikes the arm 36 and turns it over until it passes beyond or out of the path thereof by reason of the divergence of the path of the handle and arm. This movement of the arm 36 releases the retaining device 33, enabling the bed to open. In the return movement of the handle in closing the dump bed, it strikes the arm 36 just before the bed members are closed and these several impacts of the handle on the arm will dislodge any dirt at the lip of the end members. Then on the final turn the handle will strike the arm to forcibly engage the retaining device 33 with part 34 and lock the bed members together.

In the opening movement of the dump bed members, the supporting links 10 swing laterally to continually shift the fulcrum point for each bed member and prevent the operating connections from attaining inoperative position on account of approach to "dead center". The pivoted attachment of the two bed members is floating, or free of the fixed frame so that it can accommodate itself to this shifting of the bed members.

The above described bed can be dumped at one side only, by releasing one of the clutches so that the bed member on one side is disconnected from the operating mechanism. If then such operating mechanism be operated it will move the other bed member to position, and make the discharge opening only on that side, as shown in Fig. 5. At the same time the other member 1 is slightly tilted so as to fully discharge its contents through the same opening.

It is obvious that in place of the chains 22, any suitable flexible device may be used.

What we claim is:—

1. An automatic dump bed comprising two members pivoted together to swing outwardly and inwardly to open the bed at the center thereof, in combination with operating means comprising flexible elements connected to each bed member, devices operating simultaneously upon the flexible elements to open both bed members, and means for disconnecting the operating means from one of said flexible elements.

2. A dump bed comprising two dump bed members pivotally connected together to swing outwardly and upwardly to open the dump bed at the center thereof, and a supporting frame for said dump bed, each dump bed member comprising a fulcrum member adjustable relatively to the dump bed member to shift the point of support of the dump bed member relatively to the center of gravity thereof.

3. A dump bed comprising two dump bed members pivoted together to swing outwardly and upwardly to open the dump bed at the center thereof, a supporting frame, a fulcrum member adjustable on the frame, and a link pivotally connected to said fulcrum member and to a dump bed member.

4. A dump bed member, a movable fulcrum therefor, operating means connected to the bed to swing the bed member on the fulcrum, and to move the fulcrum in the movement of the bed member, and means for adjusting the position of the fulcrum connection to the bed member.

5. A dump bed comprising two dump bed members pivoted together to swing outwardly and upwardly to open the dump bed at the center thereof, a supporting frame, a supporting member pivoted to the frame, a fulcrum member pivoted to the dump bed member and having said supporting member pivoted thereto, and clamping means for securing said fulcrum member in variant positions.

6. A dump bed comprising two dump bed members pivotally connected together, a frame whereon said members are mounted to swing outwardly and inwardly to open the dump bed at the center thereof, operating means comprising a worm gearing and connections therefrom to the dumped members to operate the dump bed members at both ends thereof and to hold said members in closed or open position at each end thereof, a retaining device intermediate the ends of the dump bed members to hold their adjacent edges together when the dump bed is closed, a handle for operating the worm gearing and an arm connected to the retaining device and extending in the path of said handle to be operated thereby.

7. A dump bed comprising two dump bed members pivotally connected together, a frame whereon said members are mounted to swing outwardly and inwardly to open the dump bed at the center thereof, operating means comprising a worm gearing and connections therefrom to the dump bed members to operate the dump bed members at both ends thereof and to hold said members in closed or open position at each end thereof, a retaining device intermediate the ends of the dump bed members to hold their adjacent edges together when the dump bed is closed, a handle for operating the worm gearing, and means operated by the handle to operate the retaining device.

8. A dump bed comprising two dump bed members pivoted together and having flat end portions, and a stop member therefor having incline means to engage such end portions for the purpose set forth.

9. In combination with a pivoted dump bed member, an incline stop member engaging a wall of the bed member for the purpose set forth.

In testimony whereof, we have hereunto set our hands at San Diego, California, this 25th day of August 1906.

CHARLES C. TAYLOR.
GEORGE W. WOOD.
MAYHEW A. VINCENT.

In presence of—
W. J. MOSSHOLDER,
D. A. SEVERIN,
MARKS P. MOSSHOLDER.